UNITED STATES PATENT OFFICE.

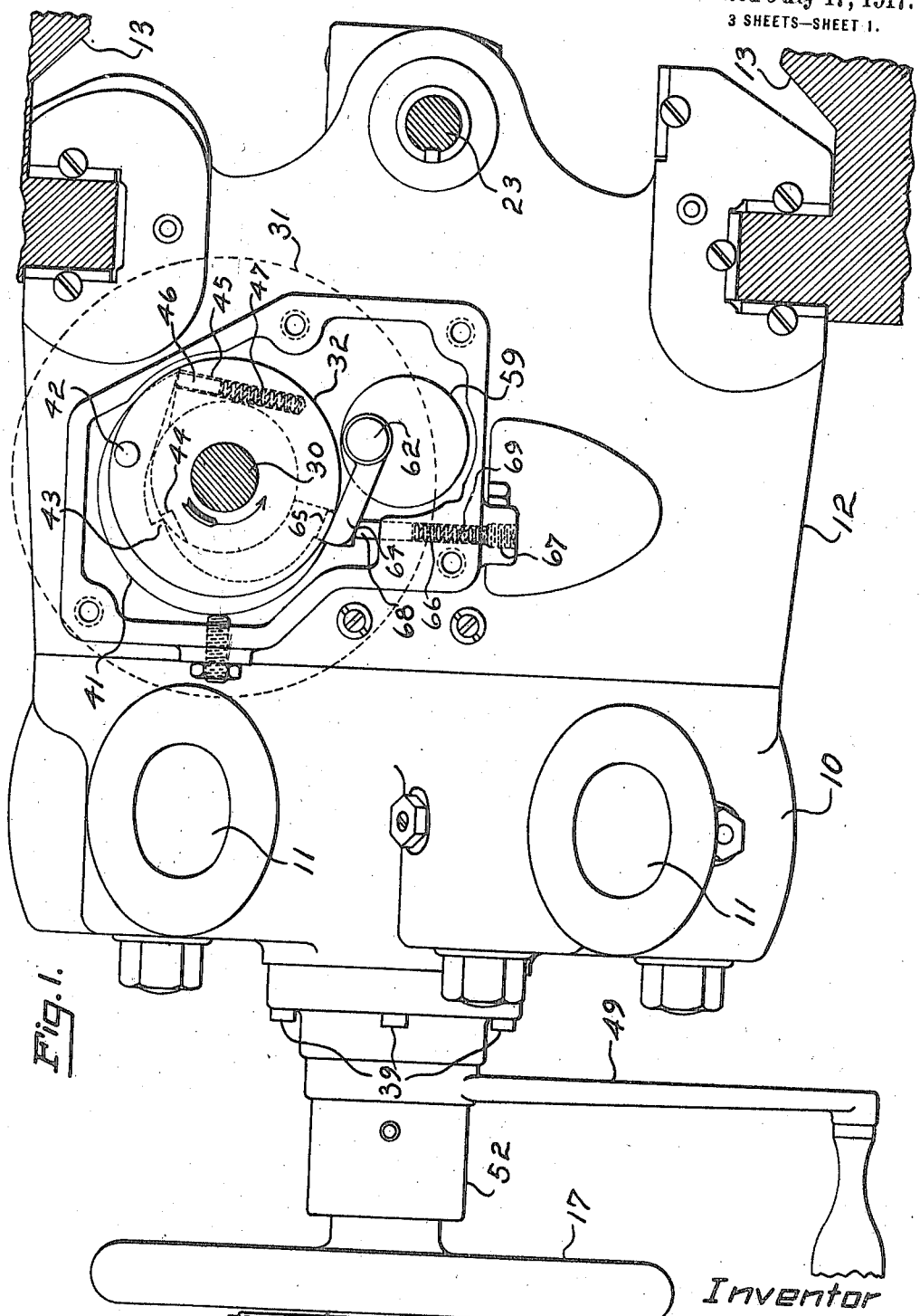

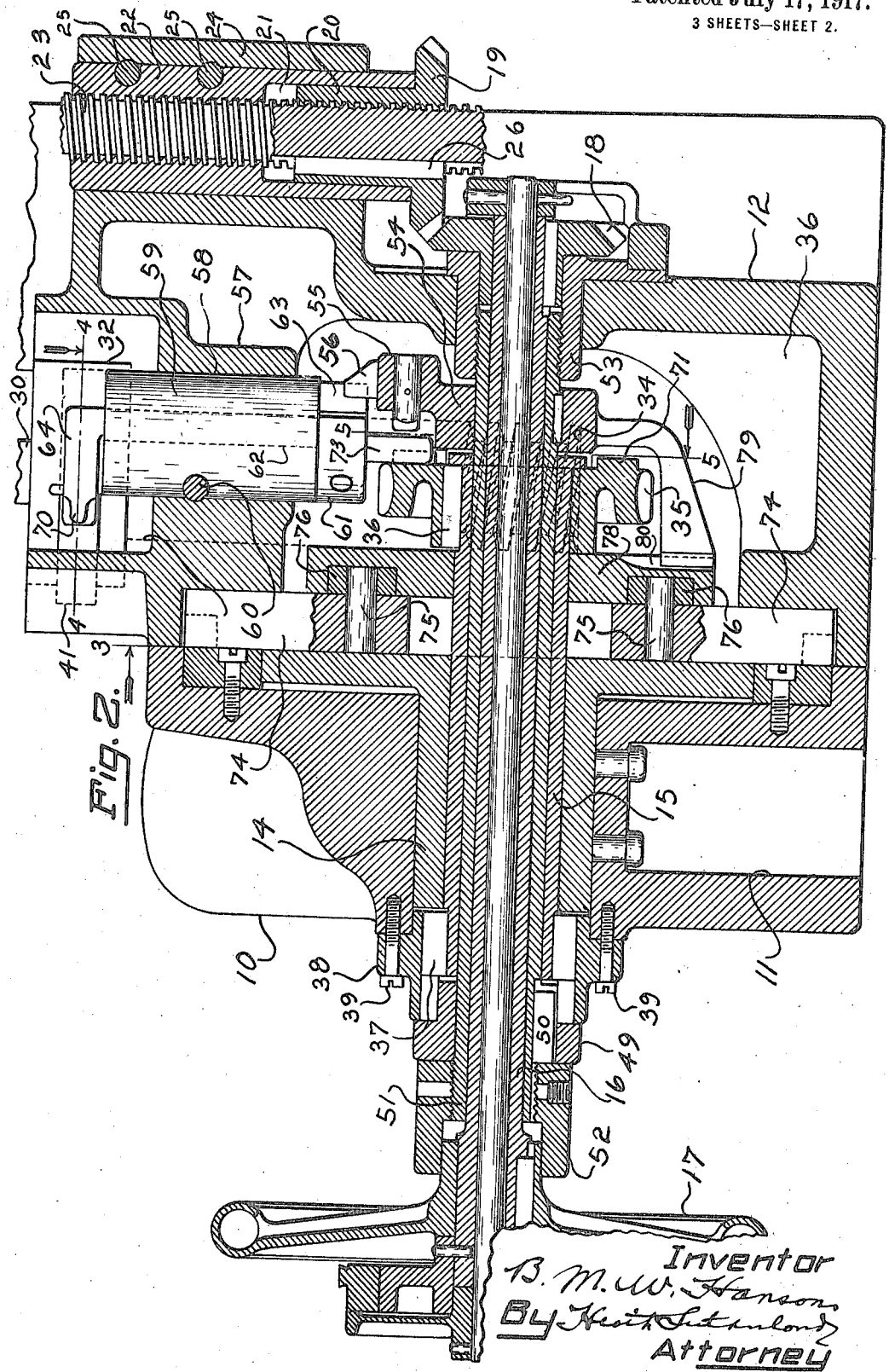

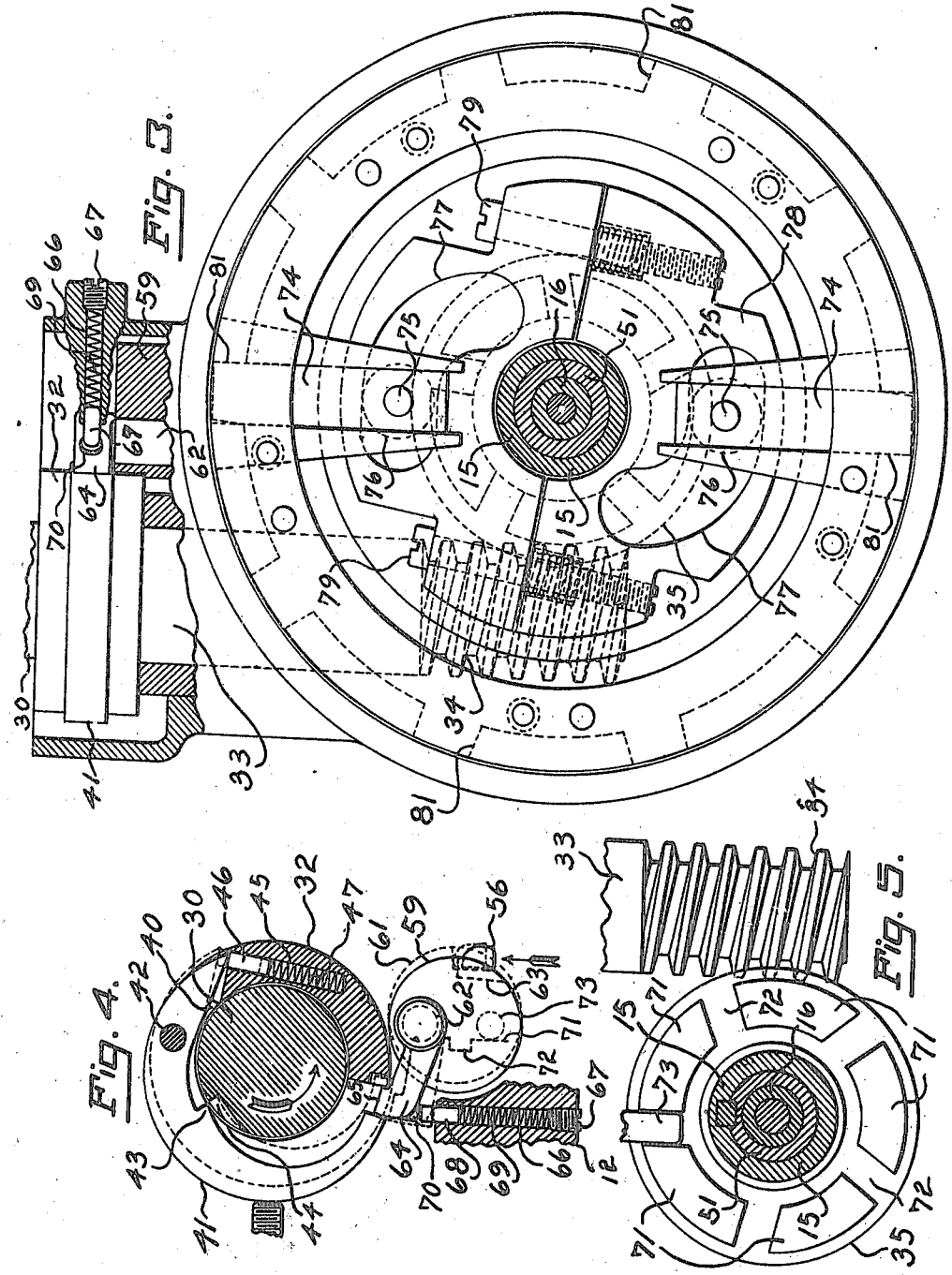

BENGT M. W. HANSON, OF HARTFORD, CONNECTICUT.

TURRET-INDEXING MECHANISM.

1,234,019.     Specification of Letters Patent.     Patented July 17, 1917.

Application filed October 9, 1916. Serial No. 124,496.

*To all whom it may concern:*

Be it known that I, BENGT M. W. HANSON, a citizen of the United States, residing at Hartford, in the county of Hartford and State of Connecticut, have invented certain new and useful Improvements in Turret-Indexing Mechanism, of which the following is a specification.

This invention relates to turret indexing mechanism. One of the objects of the invention is to provide effective means by which a turret can be rapidly and accurately indexed.

In the drawings accompanying and forming part of the present specification I have shown in detail one convenient form of embodiment of the invention, which I will set forth fully in the following description. I do not restrict myself to this particular showing; I may depart therefrom in several respects within the scope of the invention defined by the claims following said description.

Referring to said drawings:

Figure 1 is a top plan view of a turret and its slide, the column supporting the slide being shown in section.

Fig. 2 is a vertical section of the same.

Fig. 3 is a vertical section on the line 3 of Fig. 2, looking in the direction of the arrow.

Fig. 4 is a section on the line 4 of said Fig. 2, also looking in the direction of the arrow.

Fig. 5 is a detail of worm gearing and certain parts hereinafter more particularly described.

Like characters refer to like parts throughout the different views.

The machine involves in its make-up a suitable turret such as that denoted in a general way by 10, (Figs. 1 and 2). It is the primary purpose of the invention to effect the indexing of this or a similarly functioning turret by power; that is to say the turret is turned by power. In the present instance, however, the power-operated mechanism for effecting such indexing is manually controlled, although obviously the invention is not restricted in this respect. In the present showing, however, when the operator desires to index, he moves a suitable element and through this element power-operated mechanism of a proper character is thrown into working relation with the turret to effect the turning of the same. This turret is shown provided peripherally with openings as 11, of which there may be any desired number as common in the metal working art. The turret is sustained by a suitable carrier, the slide 12 being shown for this purpose. This slide is supported for vertical movement upon suitable ways on a column as 13. This column is shown merely in part in Fig. 1. The manner of supporting the slide and adjusting it on its support does not concern the present invention. The means whereby the slide is adjusted on the column or equivalent support is shown practically in detail in Fig. 2. This adjusting means, however, forms no part of the present invention. I will hereinafter in a very concise manner refer to some of the principal parts of this adjusting mechanism which as I have observed is not a part of the present invention but which concerns itself as may be inferred, merely in the indexing of a turret. For these reasons it has been quite unnecessary to illustrate the column and the bed from which it rises; as a matter of fact in vertical turrets this column rising from a bed and supporting a slide carrying a turret is quite old. From the slide 12 there extends the hollow stud 14 (Fig. 2), constituting a convenient pivot for the turret. Extending through the stud 14 is a hollow shaft or sleeve 15 which constitutes a part of my indexing mechanism. Extending in turn through the hollow shaft or sleeve 15 is a second hollow shaft 16 having fastened to its forward end a hand wheel constituting a convenient means for turning the shaft 16. This shaft 16, I might say, forms part of the slide-adjusting mechanism to which I have referred and which is not of my invention. The shaft 16 is furnished at its rear end with a bevel gear 18 keyed or otherwise suitably connected therewith in mesh with the bevel gear 19. This bevel gear 19 has an elongated upstanding hub 20 freely turnable in the chamber 21 of the nut 22, having a threaded connection with the screw shaft 23 supported in a bearing on the framing. The nut 22 fits a bearing 24 on the slide 12 and is prevented from rotating therein by keys or pins as 25. It will be understood that the screw shaft 23 is immovable longitudinally, although it is free to rotate, having a keyed connection as at 26 with the bevel gear 19. As a result, therefore, when the hand wheel 17 is turned the slide 12 will be raised or lowered, depending upon the direction of rotation of said hand wheel.

I will now proceed with the description of the indexing mechanism. This indexing mechanism involves a suitable continuously rotative member as the vertical shaft 30 which is shown in all the views except the last. In Figs. 1 and 4 I have indicated by the arrow the direction of rotation of said shaft 30, the slide being provided with suitable bearings for said shaft. The latter may be rotated in any convenient manner, the pulley 31 shown by dotted lines in Fig. 1 and this only being merely one of several means which can be provided for this purpose. This power-operated shaft 30 is connectible at will through suitable clutch means with the turret; it, therefore, follows that when the turret is in such operative connection, indexing will result. The clutching means is of such character that the turret will be turned but one step on each intermittent rotation thereof, although a greater movement of the turret may be obtained by the operator, all as will hereinafter more particularly appear. The power operated rotary shaft 30 carried by the slide 12 as shown extends into the ring 32. This ring 32 constitutes the head of the tubular shaft 33 supported for turning movement in a suitable bearing within the slide. The ring or head 32 as shown is in one piece with said hollow shaft. The latter has a suitable driving connection with the turret 10. It follows, therefore, that when the shaft 33 is operated, the turret through the intermediate connections will be indexed.

Said hollow or tubular shaft 33 is shown furnished at its lower end with a worm 34 (Fig. 5 for example) in mesh with the worm gear 35 fastened as by the key 36 to the shaft 15, inside the chamber 36' of the slide 12 as best shown in Fig. 2. This shaft 15 extends entirely through the hollow stud or pivot 14 and into said chamber, having fastened as by the key 37 to its front end the disk 38, this disk being rigidly connected as by pins or screws 39 with the turret 10 on the front and about the center thereof.

As will be understood there is mechanism between the shaft 30 and the shaft 33 by which they can be coupled at will, and when so coupled the turret 10 will be rotated for indexing or other purposes. In the present case there is clutch means interposed between the shafts in question, this clutch means being best shown in Fig. 4 and being one of several that answers properly my purposes. The head 32 has a circumferential slot or aperture 40 extending partially therearound as shown best in Fig. 4. In this slot is mounted a longitudinally curved or arcuate pawl 41 constituting a suitable clutching member, pivoted as at 42 between its ends within the slot. The pawl is so mounted as to have long and short branches. On the inner side of the longer arm of the pawl is a tooth 43 coöperative with a notch or tooth space 44 in the periphery of the shaft 30. Normally the tooth 43 is out of said tooth space or notch as illustrated by full lines in Fig. 4, so that at this time the shaft 30 rotating in the direction of the arrow applied thereto in Fig. 4 will not affect the head 32 nor the shaft 33, of which said head forms a rigid part. This relation is obtained by suitable means as will hereinafter appear. Extending approximately tangentially of the head 32 therein is the bore 45 receiving the plunger 46 backed up by the coiled spring 47 bearing thereafagainst and against the bottom of the bore. The spring exerts a constant tendency to advance the plunger which it will be observed presses against the tail of the pawl 41, so that when the pawl is released, the spring plunger by moving said tail outwardly can effect the movement of the pawl to carry the tooth 43 into the tooth space 44 and thus couple together the shafts 30 and 33 to index the turret through the described mechanism. There is a space between the front end of the pawl 41 and the corresponding end of the slot 40, this space normally receiving a suitable detent to hold the pawl 41 in its inactive position. When, however, the detent releases the pawl, the latter through the spring actuated plunger 46 will instantly move the pawl to active position. The release of this pawl can be effected at will.

The means for effecting the release of the pawl may be of any suitable character, although that shown and now to be described is quite satisfactory and comprises in its make-up the arm or lever 49, the hub of which is fastened as by the key 50 to the tubular shaft 51 interposed between the shafts 15 and 16 hereinbefore described. There may be fastened as by pinning to the front end of the shaft 51 the collar 52 which freely receives the hub of the adjusting reel 17 already described. The hub of the lever 49 as shown is disposed between this collar 42 and the disk 38. The front end of the shaft 51 extends outwardly beyond the corresponding end of the shaft 15, the lever 49 and collar 52 being carried by said extended portion. The rear end of the shaft 51 is fitted as by threading into a bushing 53 supported within an opening in the rear side of the slide 12. This bushing also receives within it for turning movement the hub of the gear 18. Fastened as by keying to the shaft 51 in proximity to the bushing 53 is the ring or collar 54. From said ring or collar (Fig. 2) the arm 55 rises, said arm being provided at its free end with a tooth 56 (see also Fig. 4), the function of which will be hereinafter explained. In the wall or web 57 constituting the top of the chamber 36' is an opening 58 which receives within it the barrel or cylinder 59 non-rotatively held in said opening as by the pin or key 60 as shown in said Fig. 2. This barrel or cylinder also appears in Fig. 4. Its upper end is closed and its lower end open. Fitted against the lower edge of the cylinder or barrel 59 at the open end thereof is the disk 61. From this disk there extends the shaft 62 which is supported for rotation by the top of the cylinder, the shaft being eccentric with respect to the cylinder as illustrated in Fig. 4. The disk 61 has a peripheral notch 63 (Figs. 2 and 4) to receive the tooth 56 which I have hereinbefore described. Fastened to the upper end of the shaft 62 is the detent 64, the inwardly extending nose of which is normally disposed between the free end of the pawl 41 and the adjacent end of the notch 40 to hold said pawl in its inactive position as shown in Fig. 4 by dotted lines. By moving the detent 64 to the dotted line position in said view, the pawl 41 will be released and can be at once moved to its active position as shown by dotted lines also in said view to couple the shafts 33 and 34 in the manner described. Contemporaneously with this as will hereinafter more particularly appear, the locking mechanism of the turret is moved to releasing position, so that when the bolt or bolts or whatever means is provided to lock the turret is in turret freeing position, the turret can be indexed.

In Figs. 1 and 2 the parts are assumed to be occupying their normal positions in full lines. It will be supposed that it is desired to index the turret. In this event the arm or lever 49 is lifted by the operator, thus through the intermediate parts swinging the arm 55 and hence the tooth 56 away from the observer in Fig. 2, causing the tooth 56 to take the direction of the arrow near it in Fig. 4 from the full line to the dotted line position. As the tooth moves from said full line to said dotted line position, it engages the adjacent wall of the notch 63 and thus moves the eccentric disk 61 to the dotted line position in Fig. 4, consequently rocking the shaft 62 to carry the detent 64 free of the pawl 41, the worm gear 35 and turret 10 having in the meantime been released, so that when the pawl 41 is freed, it is moved to active position in the manner set forth to effect through the described parts the indexing of the turret. As soon as the arm 49 is freed by the operator, it returns by gravity to its initial position, so as through the intermediate parts to return the tooth 56 to its primary position as shown by full lines in Fig. 4. The slide 12 has in proximity to the detent 64 a bore 66 closed at one end by the plug 67 and receiving at its open end the plunger 68 backed by the coiled spring 69 which constantly tends to urge the plunger outward. This plunger engages the boss 70 on the back of the detent 64 near the free end thereof. It will be assumed that the detent 64 is moved to pawl releasing position as shown by dotted lines in said Fig. 4. This results in the detent acting against the plunger 68 and the latter against its spring 69 to further compress the spring. When the head 32 has practically completed a rotation, and when the space between the free end of the pawl 41 and the adjacent end of the slot 40 comes opposite the nose 65 of the detent, said nose is at once shot into said space by the power of the spring plunger 69, so that on the final part of the rotation of the head 32 and hence of the shaft 43 of which said head forms a part, the tooth 43 will be moved out of the coöperating notch 44, this occurring just as the rotation of the shaft 33 is completed, the consequence being that the turret through the intermediate parts will be advanced one step, the various elements being so proportioned as to secure this in indexing.

On the rear face of the worm gear 35 are the segments 71, the spaces 72 between which are adapted to successively receive a locking member such as the pin 73 depending from the disk 61. These segments 71 are equidistantly spaced, and they might collectively be considered to be a notched annular flange. The pin 73 is shown as occupying one of the spaces in Figs. 2 and 5, being at this time in its locking relation. When the disk 61 is advanced by the tooth 56 in the manner set forth, the disk as it turns carries the pin 73 out of the space 72 in which it may for the time being be seated, thus releasing the worm gear 35, the release of the worm gear occurring practically at the time the pawl 41 is freed. When the disk 61 is retracted through the influence of the spring actuated plunger 68, the pin 73 is moved into the proper notch 72 to lock the worm gear 35 against overthrow.

The locking means for the turret may be of any suitable kind, diametrically opposite bolts 74 (see Figs. 2 and 3) being shown for this purpose, the tips of these bolts being adapted to engage opposite notches in the turret as shown in Fig. 3 when the bolts are in their active or turret locking position as common. The bolts are provided near their inner ends with pins 75 carrying anti-friction rollers 76 fitting cam slots 77 in the split disk 78 turnable on the tubular shaft 15, the sections of the disk being united in some suitable manner as by the screws 79. The collar 54 which I have hereinbefore described is furnished with a depending bent arm 79, the free end of which fits the aperture 80 in any of the sections of the split disk 78 as shown in Fig. 2. When, therefore, the collar 54 is turned in the manner hereinbefore described to effect indexing, the arm 79 is moved toward the observer in Fig. 2 so as to rock the plate or disk 78 and thus cause the cam slot 77 through the anti-friction rollers 76 to retract the bolts 74 and thus release the turret 10, the release of the turret occurring practically an instant before the pawl 41 is freed. As the lever 49 drops, it acts through the intermediate parts to advance the two locking bolts 74 and the turret will be locked when diametrically opposite notches 81 within it, are brought opposite the locking bolts which are shot into said notches through the primary effect of the descending weighted lever 49.

What I claim is:

1. The combination of a pivotally mounted turret, an element extending through the pivot of the turret, a second element also extending through said pivot and having a rigid connection with the turret, and means actuated by the first element for operating the second element to effect indexing of the turret.

2. The combination of a pivotally mounted turret, a tubular shaft extending through the pivot of the turret, a second tubular shaft also extending through said pivot and having a rigid connection with the turret, and means actuated by the first mentioned shaft for effecting the operation of the second mentioned shaft to index the turret.

3. The combination of a pivotally mounted turret, a manually operable means extending through the pivot of the turret, and power actuated means set in action by said manually operable means, for indexing the turret.

4. The combination of a turret, a power driven element, a second element operatively connected with the turret, a clutch member supported by one of the elements, means tending constantly to move the clutch member into engaging relation with the other element to effect their rotation together when such engagement occurs, and means for normally holding the clutch member in inactive relation.

5. The combination of a turret, a power driven element, a second element operatively connected with the turret, a clutch member supported by one of the elements, means tending constantly to move the clutch member into engaging relation with the other element to effect their rotation together when such engagement occurs, and means for normally holding the clutch member in inactive relation, movable to release said clutch member, and to subsequently move it to inactive relation.

6. The combination of a turret, a power driven element, a second element operatively connected with the turret, a clutch member supported by one of the elements, a spring acting against the clutch member and tending constantly to move the same into engaging relation with the other element to effect the rotation of said elements when such engagement occurs, a detent for normally holding the clutch member against movement, and means for releasing said clutch member.

7. The combination of a turret, a power driven element, a second element operatively connected with the turret, a clutch member supported by one of the elements, means tending constantly to move the clutch member into engaging relation with the other element to effect the rotation of said elements together when such engagement occurs, a detent for normally holding the clutch member against movement, and means operable at will for disengaging the detent and the clutch member to release the clutch member.

8. The combination of a turret, a power driven element, a second element operatively connected with the turret, a clutch member supported by one of the elements, means tending constantly to move the clutch member into engaging relation with the other element to effect their rotation together when such engagement occurs, a detent for normally holding the clutch member in inactive relation, means tending constantly to hold said detent in its operative position, and means for releasing the clutch member and the detent.

9. The combination of a turret, a power driven element, a second element operatively connected with the turret, a clutch member supported by one of the elements, a spring acting against the clutch member and tending constantly to move the clutch member into engaging relation with the other element to couple the same when said engagement occurs, a detent for normally holding the clutch member in inactive relation, spring means acting against the detent to hold it in such relation, and means for disengaging the detent from the clutch member.

10. The combination of a turret, a continuously driven power rotative shaft, a second shaft operatively connected with the turret, a pawl pivotally supported by the second shaft, the first shaft having a space to be engaged by the tooth of the pawl, spring means acting against the pawl and tending constantly to move it toward operative position, and a detent normally holding the pawl in inactive position.

11. The combination of a pivotally mounted turret, a shaft extending through the pivot of the turret, a power operated element, a second element operatively connected with the turret, and means actuated by said shaft for clutching the two elements together.

12. The combination of a pivotally mounted turret, a shaft extending through the pivot of the turret, an arm connected with said shaft and provided with a tooth, a disk actuated by said tooth on the movement of said arm with said shaft, a shaft eccentrically connected with the disk and provided with a detent, an element operatively connected with the turret, a continuously rotative power driven element, a clutch member supported by one of the elements, means acting against the clutch member and tending constantly to move it into engagement with the other clutch member, and means for normally holding the detent and the detent in turn normally holding the clutch member in inactive position.

13. The combination of a pivotally mounted turret, a shaft extending through the pivot of the turret, an arm connected with said shaft and provided with a tooth, a disk actuated by said tooth on the movement of said arm with said shaft, a shaft eccentrically connected with the disk and provided with a detent, an element operatively connected with the turret, a continuously rotative power driven element, a clutch member supported by one of the elements, means acting against the clutch member and tending constantly to move it into engagement with the other clutch member, and a spring plunger acting against said detent to normally hold it in position to restrain the movement of the clutch member.

14. The combination of a pivotally mounted turret, a manually operable shaft extending through the pivot of said turret, a power driven shaft, a second shaft operatively connected with the turret, and means actuated by the first shaft for clutching together the second and third shafts to effect a definite degree of movement and thereby indexing of the turret.

In testimony whereof I affix my signature in the presence of two witnesses.

BENGT M. W. HANSON.

Witnesses:
JOSEPH F. COOLEY,
HEATH SUTHERLAND.

Copies of this patent may be obtained for five cents each, by addressing the "Commissioner of Patents, Washington, D. C."